Aug. 15, 1950   R. P. EVANS ET AL   2,519,330
METHOD OF CUTTING WOVEN PLASTIC TO
FORM A DISPLACED EDGE
Filed July 13, 1948
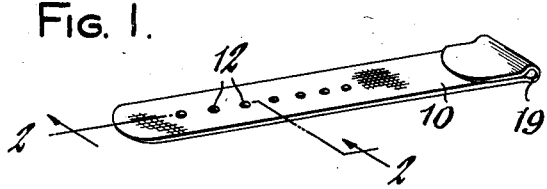
FIG. 1.
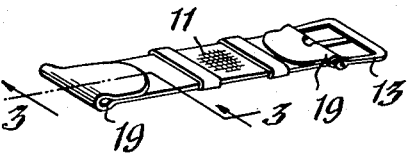
FIG. 3.
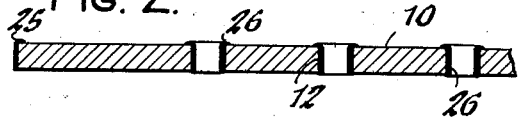
FIG. 2.
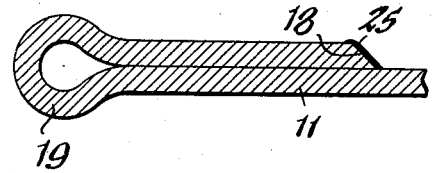
FIG. 4.
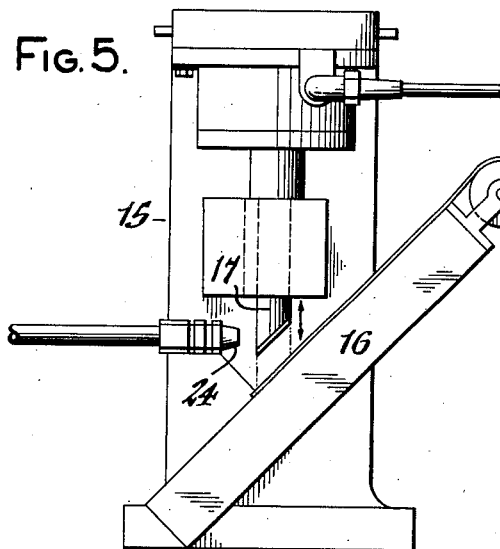
FIG. 5.
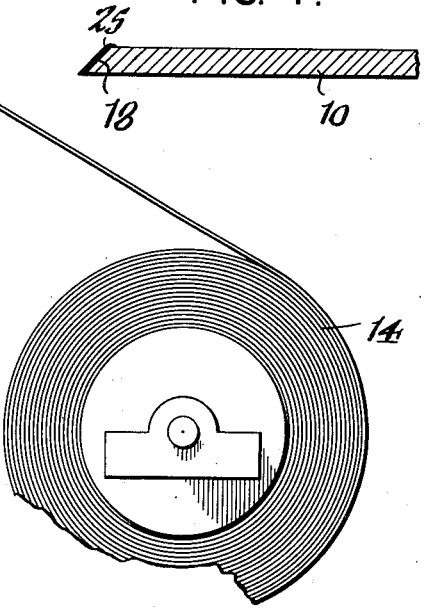
FIG. 6.
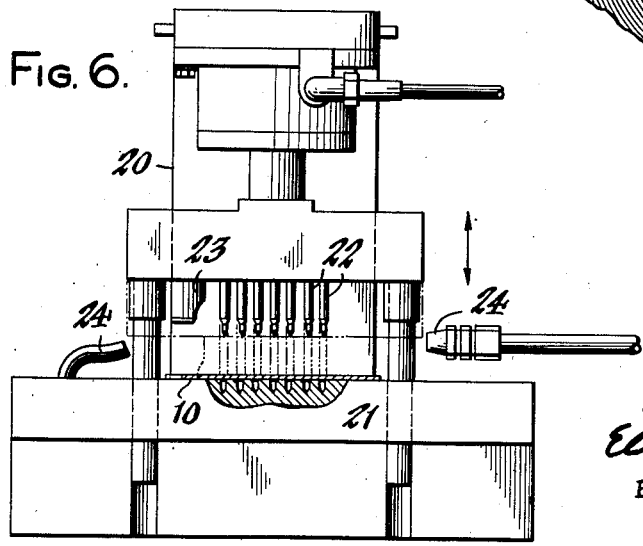
INVENTORS,
Robert P. Evans,
Elnathan N. Miller, Jr.,
BY Walter P. Geyer
ATTORNEY Patented Aug. 15, 1950

2,519,330

UNITED STATES PATENT OFFICE 2,519,330

METHOD OF CUTTING WOVEN PLASTIC TO FORM A DISPLACED EDGE

Robert P. Evans and Elnathan H. Miller, Jr., Buffalo, N. Y., assignors to Pla-Safe Plastics Corporation, Buffalo, N. Y., a corporation of New York Application July 13, 1948, Serial No. 38,436

3 Claims. (Cl. 154—125)

1

This invention relates to certain new and useful improvements in the manufacture of products made from a threaded or woven plastic material, such as watch straps, belts, etc.

It has for one of its objects to so treat the material at those edges thereof resulting from cutting or punching as to prevent its unraveling.

Another object of the invention is to effect a heat treatment of the plastic products in such a manner and at the edges or other warp-exposed areas, and simultaneously with the cutting or punching operation, as to cause the material adjacent such edges to flow or melt and thereby effect a self-sealing of the exposed edges in a beading or marginal fashion to positively prevent unraveling of the material at such edges or other areas.

A still further object is to provide a novel method of self-sealing the edges of the material or products of this character which is simple and efficient in operation, and which results in a neatly-finished edge.

In the accompanying drawings:

Figure 1 is a perspective view of a two-section, buckle type watch strap showing the opposite edges and the edges about the row of buckle-engaging openings sealed by our invention. Figures 2 and 3 are enlarged fragmentary cross sections taken on the correspondingly-numbered lines in Figure 1. Figure 4 is an enlarged fragmentary cross section of the edge-seal effected when cutting the material into a given length for a watch strap. Figure 5 is a front view of the machine employed for cutting the strapping material into proper lengths and simultaneously sealing an edge thereof. Figure 6 is a front view of the machine employed for cutting the waste from the strap-section, punching the holes therein for adjustable engagement with the buckle, and sealing the cut edge of such section and the edges about the punched holes.

Similar characters of reference indicate corresponding parts throughout the several views.

In the manufacture of threaded or woven products, such as watch straps, belts and the like made from a plastic or synthetic material like nylon, such products have a tendency to unravel at their edges or in other areas, as for example, about the openings or slots provided in watch straps or belts for rendering them adjustable by a buckle fitting. It is the purpose of our invention to so treat such edges as to effect their self-sealing to positively prevent unraveling and thereby maintain the product at all times neat in appearance and increase its duration of usefulness.

2

Referring now to the drawings, showing an embodiment of the use of our invention as applied to a woven, plastic watch strap by way of example, 10, 11 indicate the complementary sections of such a strap, one having the usual row of openings or perforations 12 therein for the adjustment of the strap on the wearer through the medium of the customary buckle 13 borne by the other strap-section. The side or longitudinal edges of the strap are usually finished by hemming or otherwise, and in manufacturing the straps they are cut into proper lengths from a reel of strap-forming material, such as woven nylon, and unless the cut edges formed by the warp threads are similarly hemmed or finished the strap will unravel.

We effect the finishing of the end edges and the margins about the perforations of the strap by a heat treatment simultaneously with that of the cutting and perforation-forming operations. To this end the strap-sections 10, 11 are cut from a continuous strip of tape-like material applied to a reel 14 and from this reel the material is fed by hand or otherwise to a suitable machine, indicated generally by the numeral 15, and including a strap guide or table 16 and a vertically-reciprocating cutter 17. The table is preferably inclined, as shown, and the cutter is preferably arcuate in cross section so that the edge of the strap, when cut has a corresponding sloping or beveled edge 18, shown in Figure 4, of convex contour. This convex edge portion of the strap is subsequently folded and sealed upon itself to provide an attaching eye 19 for receiving the connecting pintle of the watch and this beveling cut provides a feathering edge for a neat and smooth connection. The companion strap-section 11 is provided with similarly formed eyes 19. The complementary concave portion in the resulting adjoining strap-section is merely waste and is subsequently removed. This latter operation may be accomplished, for example, in a suitable machine indicated generally by the numeral 20 for punching the perforations 12 in the strap-section 10, and includes a horizontal strap-guide or table 21, a row of vertically-reciprocating punches 22, and a like reciprocating cutter 23 of arcuate cross section to sever the waste portion from the strap-section and at the same time provide the latter with a convex edge at its free end.

These cutters are preferably made from stainless steel to withstand high temperatures and are heated to substantially a cherry red heat to approximately 1100° F. by means of gas jets 24 or the like which constantly play against the cutters during the operation of the respective machines 15 and 20. Thus, simultaneously with the cutting operations, the warp edges of the strap contacted by the cutters are heated to a temperature to cause the material to fuse, melt or reach a fluid state and thereby effect the automatic sealing of the strap edges or the edges of the strap-perforations. Furthermore, the initial melting takes place on the down-stroke of the cutters and punches, while on the upstroke the cutters and punches act to direct some of the marginal melted material toward the top surface of the strap where desired and by a wiping action provide a smooth-finished and sealed-over edging or beading 25, 26 at the end and about the perforations of the strip to effectually bond such edges and prevent their unraveling. The melting of the material provides a film which sets and hardens within a relatively short period of time after the operating stroke of the cutters or punches on the strap-sections.

We claim as our invention:

1. In the manufacture of products woven from a plastic material, the method which consists of cutting the woven material to define an edge and simultaneously therewith subjecting the material in the vicinity of the cut to a temperature to fuse the portion contacted, and then by a wiping action displacing the fused portion of the material over the surface thereof to form an integral sealing-like film over the marginal portion of its cut edge.

2. In the manufacture of products woven from a plastic material, the method which consists of cutting the woven material by a stroke-like action in one direction to define an edge and subjecting the material in the vicinity of the cut to a temperature to fuse the portion contacted, and then by a wiping, stroke-like action in the opposite direction displacing the fused portion of the material over the surface thereof to form a sealing-like bead over the marginal portion of its cut edge.

3. In the manufacture of a perforated watch strap or the like woven from a plastic material, the method which consists of cutting the perforations therein and subjecting the walls thereof to a temperature to fuse the same, and then by a wiping action displacing the fused portion of the material over the surface of the strap about the margins of the perforations to provide integrally-formed grommets about the same.

ROBERT P. EVANS.
ELNATHAN H. MILLER, JR.

REFERENCES CITED

The following references are of record in the file of this patent:

UNITED STATES PATENTS

| Number | Name | Date |
| --- | --- | --- |
| 1,773,967 | Dreyfus | Aug. 26, 1930 |
| 1,871,897 | Manheimer | Aug. 16, 1932 |
| 1,978,620 | Brewster | Oct. 30, 1934 |
| 2,232,640 | Schwartzman | Feb. 18, 1941 |
| 2,328,063 | Dodge | Aug. 31, 1943 |
| 2,430,496 | Dodge | Nov. 11, 1947 |
| 2,438,156 | Dodge | Mar. 23, 1948 |